United States Patent
Alder et al.

[11] Patent Number: 5,431,607
[45] Date of Patent: Jul. 11, 1995

[54] DRIVE AND BRAKING ARRANGEMENT FOR A MOTOR VEHICLE

[75] Inventors: Uwe Alder, Schweinfurt; Hans-Jürgen Drexl, Schonungen/Mgb.; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Hassfurt; Michael Wagner, Niederwerrn; Holger Westendorf, Hambach; Rainer Wychnanek, Madenhausen, all of Germany

[73] Assignee: Mannesmann Aktiengesellschaft, Dusseldorf, Germany

[21] Appl. No.: 190,121

[22] PCT Filed: Oct. 22, 1992

[86] PCT No.: PCT/DE92/00907
§ 371 Date: Feb. 3, 1994
§ 102(e) Date: Feb. 3, 1994

[87] PCT Pub. No.: WO93/11014
PCT Pub. Date: Jun. 10, 1993

[30] Foreign Application Priority Data
Nov. 29, 1991 [DE] Germany .................. 41 39 443.7

[51] Int. Cl.⁶ .............. B60T 8/32; B60K 41/20; B60L 7/00; B60R 75/08
[52] U.S. Cl. .............. 477/4; 477/24; 477/27; 180/65.4; 180/287
[58] Field of Search .......... 477/4, 21, 23, 27, 28, 477/29; 180/65.4, 65.8, 287

[56] References Cited
U.S. PATENT DOCUMENTS

| | | | |
|---|---|---|---|
| 4,223,775 | 9/1980 | Lloyd | 477/21 X |
| 4,446,950 | 5/1984 | Wise et al. | 180/287 X |
| 5,351,781 | 10/1994 | Pritchard et al. | 180/287 |

FOREIGN PATENT DOCUMENTS

| | | | |
|---|---|---|---|
| 2604600 | 6/1977 | Germany | 477/28 |
| 3421854 | 12/1985 | Germany . | |
| 3618532 | 12/1986 | Germany . | |
| 3829024 | 3/1989 | Germany . | |
| 3909907 | 9/1990 | Germany . | |
| 3251002 | 11/1991 | Japan | 180/65.8 |
| 9115378 | 10/1991 | WIPO . | |

Primary Examiner—Charles A. Marmor
Assistant Examiner—Nathan O. Jensen
Attorney, Agent, or Firm—Cohen, Pontani, Lieberman, Pavane

[57] ABSTRACT

A drive and braking arrangement for a motor vehicle has at least one electric motor which drives the motor vehicle in dependence on the setting of an accelerator pedal. A forward drive or reverse drive selector (15) adjusts the driving direction of rotation of the electric motor, and a sensor is provided for detecting the driving speed of the motor vehicle. In order to control the braking force of a friction brake arrangement acting on at least one wheel of the motor vehicle, an actuating drive is provided which is set to a braking position by an electronic control unit when the accelerator pedal remains in a driving position for longer than a predetermined period of time and at the same time the detected driving speed is zero and/or when the sensor associated with the control unit detects an actual movement of the motor vehicle in the direction opposite to the driving direction selected at the selector.

15 Claims, 1 Drawing Sheet

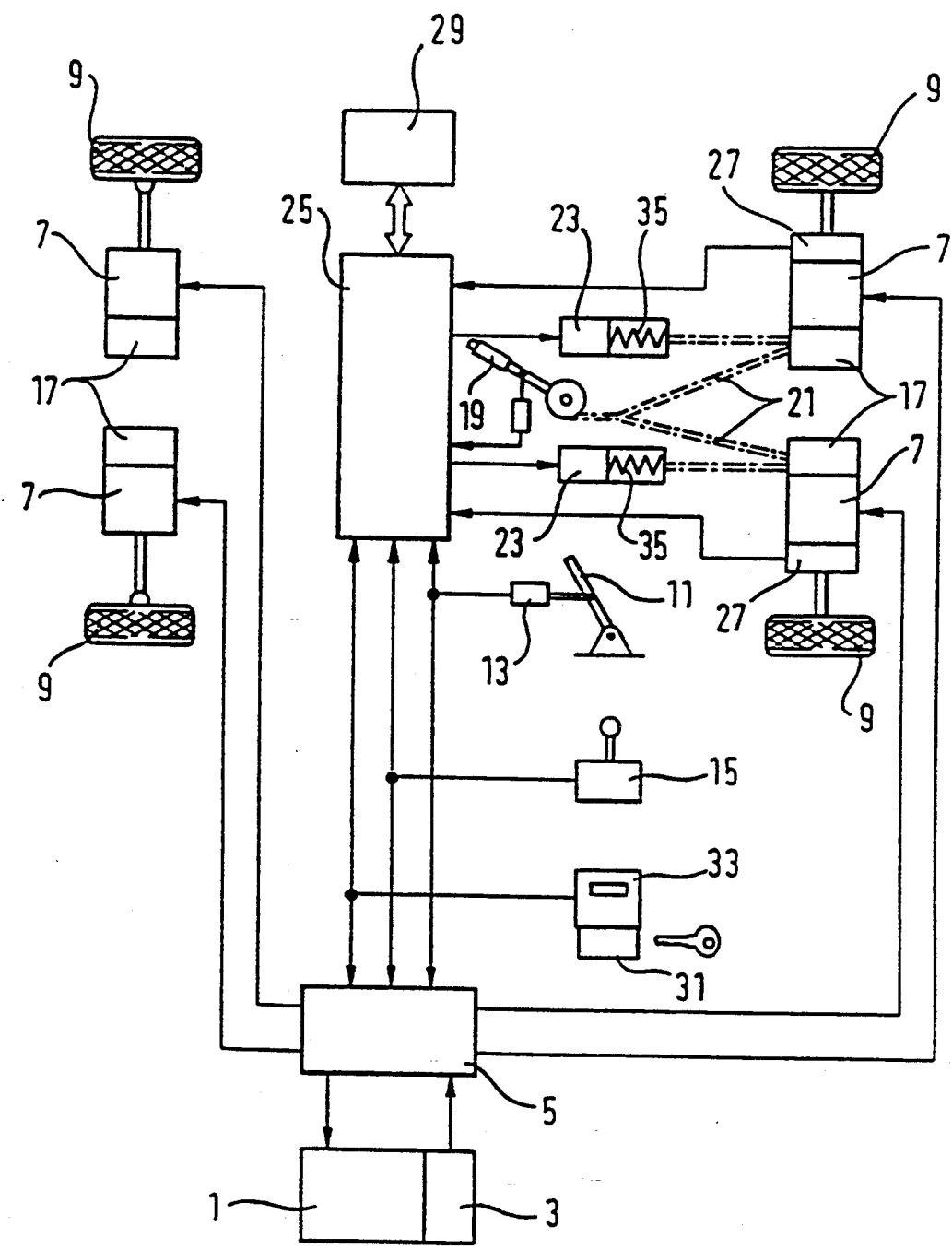

DRIVE AND BRAKING ARRANGEMENT FOR A MOTOR VEHICLE

BACKGROUND OF THE INVENTION

1. Field of the Invention

The invention is directed to a drive and braking arrangement for a motor vehicle having at least one electric motor which drives the motor vehicle in dependence on the setting of an accelerator pedal, a forward-/reverse drive direction selector which adjusts the driving direction of rotation of the electric motor or electric motors, means for detecting the driving speed of the motor vehicle, and a friction brake arrangement acting on at least one wheel of the motor vehicle.

2. Description of the Prior Art

Motor vehicles whose wheels are driven by electric motors, which are known, for example, from "VDI-Berichte", No. 878, 1991, pages 611 to 622, can be prevented from rolling backward on inclined roadways by the electric motors by means of depressing the accelerator pedal in a manner similar to conventional motor vehicles with automatic transmissions. Since the electric motors must be able to apply the driving moment preventing the motor vehicle from rolling backward in the stationary state, a comparatively high current passes through the motor which can lead to overheating and destruction of the electric motors.

It is known from DE-A-32 38 196 to prevent motor vehicles with automatic transmission from "creeping" during idling by means of an automatic auxiliary brake. The automatic auxiliary brake has an actuating drive which actuates the brake system of the motor vehicle and is set to a braking position when the driving speed lies below a limiting value close to zero and the brake pedal and accelerator pedal are not actuated. The auxiliary brake is released when actuating the gas pedal and/or brake pedal.

Further, an auxiliary brake for a motor vehicle with a conventional mechanical drive train is known from DE 39 09 907 A1. This auxiliary brake automatically assumes a braking position as soon as the actual rotating direction of the wheel does not correspond to the selected drive gear of the gear shift and is automatically released as soon as the rotating direction of the wheel matches the selected drive gear. This improves comfort as the auxiliary brake is actuated, i.e. applied or released, automatically without any effort on the part of the driver as soon as the motor vehicle is in a parking or driving situation requiring the application or release of the auxiliary brake. For this purpose, the motor vehicle is outfitted with:

- an internal combustion engine driving the vehicle via an automatic transmission as a function of the position of the accelerator pedal,
- a forward/reverse gear selector,
- means for detecting the speed of the vehicle,
- an auxiliary brake acting on the wheels of one axle,
- an actuating drive for adjusting the braking force of the auxiliary brake, and
- an electronic control unit which actuates the actuating drive in the manner described above.

SUMMARY OF THE INVENTION

In this known vehicle, the actuation of the auxiliary brake does not depend on the position or setting of the accelerator pedal. Special means for protecting the drive system in the event that the vehicle is kept stationary, i.e. via a motor, by the driving moment of the drive system, e.g. on an incline, are not provided, nor are they necessary.

The object of the present invention is to provide a drive and braking arrangement for a motor vehicle driven by electric motors which not only facilitates operation of the motor vehicle when driving up an incline, but also eliminates the risk of damage to the drive arrangement.

Proceeding from the drive and braking arrangement discussed above, this object is met according to the invention in that the friction brake arrangement includes an actuating drive controlling the braking force and in that an electronic control unit sets the actuating drive to a braking position when the accelerator pedal remains in a drive position for longer than a predetermined period of time and at the same time the detected driving speed is zero and/or when the means associated with the control unit detect an actual movement of the motor vehicle in the direction opposite the driving direction selected at the selector.

In a drive and braking arrangement of this type, the motor vehicle is automatically braked in a driving situation which could lead to an overloading of the electric motors. The actuating drive is set in its braking position when the electric motors are stopped by the actuation of the accelerator pedal or produce a moment opposite the direction of rotation when rolling backward. In either case, operation of the motor vehicle is facilitated.

The brake is released again as a function of the position of the accelerator pedal. For this purpose, means may be associated with the control unit which detect a driving moment applied by the electric motor or electric motors. The control unit sets the actuating drive to a brake release position when the detected driving moment is greater than a given value. In this way, the brake is only released when the electric motors have built up a sufficient driving moment.

To make driving up an incline as comfortable and free of jolts as possible, means are associated with the control unit which, when the vehicle is stationary, determine data representing a holding moment applied by the electric motor or electric motors in the stationary state and store the determined moment data in a data storage.

The control unit sets the actuating drive to a brake release position when a torque set by the accelerator pedal exceeds the stored value of the holding moment. The current driving moment applied by the electric motors is also advisably detected in this instance and compared with the stored value.

Finally, in another variant which can prevent the vehicle from rolling backward when driving on an incline, the control unit sets the actuating drive to a brake release position only when the accelerator pedal is set to a driving position and the driving direction set on the driving direction selector switch corresponds to the actual movement direction. This variant also ensures that the brake is only released when the driving moment applied by the electric motor is greater than the braking moment.

In order to ensure driving which is as comfortable and free of jolts as possible, the control unit sets the actuating drive to a brake release position at an actuating speed which changes in accordance with a predetermined characteristic line in a time-dependent manner and/or as a function of the setting of the accelerator pedal and/or as a function of a change in the driving speed of the motor vehicle. For example, if the actuating speed of the actuating drive is increased in a continuous manner when starting to drive, driving can start without jolts and the brake arrangement is spared at the same time. Excessive dragging of the brake can be prevented if the actuating speed is increased as deflection of the accelerator pedal is increased or with increasing driving speed.

The control unit could conceivably always set the actuating drive to the position of maximum braking moment. Although this type of operation dependably provides for a sufficient braking moment, it shortens the life of the actuating drive and braking arrangement under certain conditions due to the increased mechanical stress. Therefore, in a preferred construction, means are associated with the control unit which, when the vehicle is stationary, detect data representing a holding moment applied by the electric motor or electric motors when stationary and/or a braking moment adjusted at a manually operated device of the friction brake arrangement and store the determined moment data in a data storage. The control unit then sets the actuating drive to a braking position in which the braking moment of the friction brake arrangement is equal to or greater by a given value than the moment corresponding to the stored moment data. In this way, only the braking moment required for the driving situation in question is adjusted at the braking arrangement. In addition to the reduced mechanical stress on the braking arrangement and its actuating drive, this has the advantage that the brake can be released faster when starting to drive.

Since not all driving situations allow the braking moment to be detected and stored when the vehicle is stationary, another advisable variant provides for the control unit to set the actuating drive to a predetermined braking position in which the braking moment is less than the maximum braking moment of the friction brake arrangement. The mechanical stress on the braking arrangement is also comparatively low in this variant and the brakes can be released faster.

Since the braking action of the braking arrangement can change in a time-dependent manner, it is provided in a preferred construction that when the friction brake arrangement is set to the braking position the control unit sets the friction brake arrangement to a position of maximum braking moment when the detected driving speed is greater than zero in a neutral position of the accelerator pedal. In this way, the maximum braking action is only adjusted when the braking moment proves inadequate in its normal operation setting. This operating mode is particularly advantageous when the braking arrangement is used at the same time as a parking brake for the motor vehicle.

The possibility of automatically braking the motor vehicle when stationary can also be used as an anti-theft function if authorization checking means which respond to a password or key are associated with the control unit and the control unit only sets the actuating drive to a brake release position when authorized. The authorization checking means can be a conventional key-actuated lock or a card reader or a keypad for entering a code.

In normal operation of the motor vehicle, the rate of the successive braking cycles of the type mentioned above is low. On the other hand, the actuating drive must be capable of quickly setting the braking arrangement to its braking position. Therefore, in order to keep the drive output of the actuating drive as low as possible an energy accumulator, particularly a spring accumulator or a fluid pressure accumulator, is advisably associated with the actuating drive and the actuating drive draws the energy required for setting the braking position of the friction brake arrangement from the energy accumulator. For example, the spring accumulator of the actuating drive can be slowly wound up by a comparatively small electric motor. On the other hand, if the actuating drive is set to the braking position, the spring accumulator supports the wind-up motor. Moreover, the use of a mechanical energy accumulator has the advantage that the braking arrangement can be set to the braking position by servomechanism support when the ignition is turned off.

The components used for controlling the braking arrangement can be utilized for enhanced protection of the motor vehicle driven by an electric motor against faulty operation. For this purpose, an advisable construction provides a forward/reverse drive direction selector which adjusts the driving direction of rotation of the electric motor or electric motors and means which allow the rotating direction of the electric motor or electric motors to be changed when the selector setting is changed only when a stationary state of the vehicle is detected and/or after the actuating drive has been set to the braking position.

The friction brake arrangement mentioned above functions as an auxiliary brake. This function can be achieved in that the actuating drive additionally acts on the foot brake or operating brake of the motor vehicle which can be actuated by a brake pedal. However, for safety-related reasons, it can also serve as an additional braking arrangement which can be actuated manually as well as by the actuating drive. To keep construction costs as low as possible, each electric motor is combined in its own constructional unit with wheel brakes of the driven wheels in an embodiment in which the electric motors drive separate wheels of the motor vehicle.

BRIEF DESCRIPTION OF THE DRAWING

The invention is explained in detail in the following with reference to the drawing. The drawing shows a block diagram of a drive and braking arrangement, according to the invention, for a motor vehicle with four-wheel drive.

DETAILED DESCRIPTION OF THE PREFERRED EMBODIMENTS

The motor vehicle has an internal combustion engine 1 with a generator arrangement 3 which is attached thereto by flanges and supplies electric motors 7 at the individual wheels 9 via an electronic control unit 5. The control unit 5 controls the output of the internal combustion engine 1 via actuating drives, not shown in more detail, and the electrical power supplied to the electric motors 7 by the generator arrangement 3 as a function of the position of the accelerator pedal 11, whose position is determined by a position sensor 13. The rotating direction of the electric motors 7, and accordingly the driving direction of the motor vehicle, is determined by a manually operated selector 15 by means of which the driver can shift between forward and reverse driving directions. The driver determines the torque generated by the electric motors 7 at the individual wheels 9 and/or the speed of the electric motors 7 via the accelerator pedal 11.

Each electric motor 7 forms a constructional unit with wheel brake devices 17 of an operating brake arrangement, not shown in detail, of the motor vehicle which can be actuated via a brake pedal. A conventional auxiliary brake arrangement acts additionally on a portion of the wheel brake arrangements 17, the rear wheels 9 in this instance, and has a manually actuated hand brake lever 19 that is connected with the wheel brake arrangements 17 of these wheels 9 via a mechanical or hydraulic force transmission arrangement 21. The auxiliary brake arrangement can act on the wheel brake arrangements 17 of the operating brake or on separate wheel brake arrangements.

A motor vehicle of the type described above could also be held stationary on an incline and prevented from rolling backward by actuating the accelerator pedal 11 without actuating the operating brake or the auxiliary brake. The holding moment produced in the stationary state of the electric motors 7 generates considerable heat in the electric motors 7 and, under certain conditions, leads to their destruction. To relieve the electric motors 7 in the stationary state from the holding moment, actuating drives 23 are associated with the wheel brake arrangements 17 of either the operating brake or the auxiliary brake. These actuating drives 23 are controlled by a brake control unit 25. The brake control unit 25 responds to information from sensors 27 arranged at the electric motors 7 or at the wheels 9 driven by the electric motors 7. This information supplies data concerning the number of revolutions of the wheels 9 and accordingly the driving speed and/or data concerning the drive torque applied by the electric motors 7. The torque data can be calculated in particular from the electrical power consumed by the electric motors 7 so that these data can also be supplied, if necessary, by the control unit 5. The brake control unit 25 detects the holding moment applied by the electric motors 7 at a driving speed of zero and adjusts the actuating drives 23 to a braking moment which corresponds to the holding moment of the electric motors 7 or which, for safety reasons, exceeds this holding moment by a given amount. However, the actuating drives 23 are only set to their braking position when the accelerator pedal 11 has been depressed for longer than a given period of time, e.g. one second, and when the stationary state of the vehicle is sustained at the same time. The data of the last detected holding moment of the electric motors 7 are stored in a data storage 29, whereupon the electric motors 7 are turned off regardless of the actuated accelerator pedal 11.

In order to continue driving, the accelerator pedal 11 must be depressed beyond the last adjusted position and a torque exceeding the value stored in the data storage 29 must be built up at the electric motors 7. The brake control unit 25 sets the actuating drives 23 to a brake release position as soon as the driving moment applied by the electric motors 7 exceeds the stored value of the braking moment. However, the brake is released in accordance with a predetermined time function with the result that the motor vehicle can be set in motion only gradually at first. This allows the brake control unit 25 to compare speed information supplied by the sensors 27, which also contains information on the current rotating direction of the electric motors and accordingly information on the current movement direction of the motor vehicle, with information concerning the driving direction adjusted at the selector 15. The brake control unit 25 continues to release the brake only when the current movement direction conforms to the selected driving direction. If the current movement direction does not match the selected driving direction, the actuating drives 23 are set in the direction of increased braking force again. The vehicle is accordingly prevented from rolling backward on an incline.

The speed at which the brake control unit 25 sets the actuating drives 23 to the brake release position can depend on a predetermined time-dependent characteristic line and beyond this or alternatively can also be controlled in proportion to the actuating speed of the accelerator pedal 11. The preselected brake release speed can increase comfort and eliminate jolting when driving is resumed.

In contrast to conventional motor vehicles with wheels driven via mechanical transmission, the motor vehicle described above which is driven by electric motors must be secured against unintentional rolling via the auxiliary brake when parking. The brake control device 25 allows an automatic parking safety operation and sets the actuating drives 23 to a braking position when the sensors 27 determine that the vehicle is stationary at the same time that the position sensor 13 detects that the accelerator pedal 11 is located in its unactuated neutral position and an ignition lock indicated at 31 in the drawing is set to the parking position. In this case also, the brake control unit 25 sets the actuating drives 23 to a position in which the braking moment is equal to the last holding moment applied by the electric motors 7, but at least equal to a predetermined braking moment. The selected braking moment is advisably less than the maximum braking moment of the braking arrangements, but still ensures a dependable holding of the motor vehicle under normal operating conditions. Selecting the braking moment value below the maximum braking moment shortens the brake release time and spares the braking arrangement. However, if the brake control unit 25 subsequently determines after setting the actuating drives 23 that the motor vehicle has begun to roll again, the actuating drives 23 are set to the maximum braking moment. When driving is resumed, the actuating drive is only set fully to the brake release position again when the driving moment applied by the electric motors 7 after actuating the accelerator pedal 11 exceeds the value of the braking moment stored in the data storage 29 and the actual movement direction of the motor vehicle conforms to the driving direction set at the selector arrangement 15. The brake release speed can also be controlled as a function of time or as a function of the accelerator pedal position in this instance.

The ignition lock 31 or an authorization checking device 33 associated with the ignition lock 31, e.g. a code card reader or a code entry keypad, can be used to prevent theft of the motor vehicle in that the actuating drives 23 which are set to the brake position for parking are only set to the brake release position by the brake control unit 25 when the ignition key fitting the ignition lock 31 is used or when the correct password information is entered in the authorization checking device 33.

Each actuating drive 23 includes an energy accumulator 35, e.g. a spring accumulator, which is wound up by an electric motor of the actuating drive 23, not shown in detail, when releasing the brake or between successive braking cycles and either delivers all the power to be applied by the actuating drive 23 for actuating the wheel brake arrangements 17 or supports the actuating drive 23 in this respect.

In order to rule out faulty operation of the driving direction selector 15, e.g. an unintentional change of direction, the control unit 5 allows the rotating direction of the electric motors 7 to be changed only when the brake control unit 25 detects a vehicle speed of zero and/or when the actuating drives 23 have been set for a short time to a braking position applying the holding moment. Obviously, for reasons of safety, the actuating drives 23 cannot be actuated by the brake control unit 25 at vehicle speeds greater than zero. Rather, the auxiliary brake only responds to the manual actuation of the hand brake lever 19.

In the embodiment of the invention described above, the wheel brake arrangements 17 are provided with separate actuating drives 23 which are independent of the manually actuated components of the auxiliary brake so that the auxiliary brake can still be actuated manually in the event of failure of the electronic equipment or power supply or actuating drives 23. However, if necessary, a common actuating drive can be associated with a plurality of wheel brake arrangements 17 and can also act on the wheel brake arrangements 17 via the force transmission means 21 when so designed. The actuating drives 23 can also be used to reinforce the operating brake if desired, e.g. if the braking power of the operating brake is reduced due to wear or overheating.

We claim: IN THE CLAIMS:

1. A drive and braking arrangement for a motor vehicle, comprising: an accelerator pedal having a plurality of positions; at least one electric motor provided so as to drive the motor vehicle in dependence on the position of the accelerator pedal; a forward/reverse selector provided so as to adjust a driving direction of rotation of the at least one motor; means for detecting the driving speed of the motor vehicle; a friction brake arrangement provided so as to act with a braking force on at least one wheel of the motor vehicle; actuating drive means for controlling the braking force of the friction brake arrangement; and electronic control means for setting the actuating drive means to a braking position when the detecting means detects an actual movement of the motor vehicle in a direction opposite to the driving direction selected at the selector, the detecting means being associated with the control means, the control means also setting the actuating drive means to a braking position when the accelerator pedal remains in a driving position for longer than a predetermined period of time and at the same time the detected driving speed is zero.

2. An arrangement according to claim 1, and further comprising means associated with the control means for detecting a driving moment applied by the at least one electric motor, the control means setting the actuating drive means to a brake release position when the detected driving moment is greater than a given value.

3. An arrangement according to claim 1, and further comprising means associated with the control means for determining data representing a holding moment applied by the at least one electric motor when the vehicle is stationary, and for storing the determined moment data in a data storage, the control means setting the actuating drive means to a brake release position when a torque set by the accelerator pedal exceeds the stored value of the holding moment.

4. An arrangement according to claim 1, wherein tire control means sets the actuating drive means to a brake release position only when the accelerator pedal is set in a driving position and the selected driving direction corresponds to the actual movement direction.

5. An arrangement according to claim 1, wherein the control means sets the actuating drive means to a brake release position at least one of at an actuating speed which changes in accordance with a predetermined characteristic line in a time-dependent manner, as a function of the setting of the accelerator pedal and as a function of a change in the driving speed of the motor vehicle.

6. An arrangement according to claim 1, wherein the friction brake arrangement includes a manually operable device, and further comprising means associated with the control means for determining data representing at least one of a holding moment applied by the at least one electric motor when the vehicle is stationary and a braking moment adjusted at the manually operable device of the friction brake arrangement, and for storing the determined moment data in a data storage, the control means setting the actuating drive means to a braking position in which a braking moment of the friction brake is at least equal to the stored moment data.

7. An arrangement according to claim 6, wherein the control means sets the actuating drive means to a braking position in which the braking moment of the friction brake arrangement is greater than to the stored moment data by a predetermined value.

8. An arrangement according to claim 1, wherein the friction brake arrangement has a braking moment, the control means setting the actuating drive means to a predetermined braking position in which the braking moment is less than a maximum braking moment of the friction brake arrangement.

9. An arrangement according to claim 6, wherein, when the friction brake arrangement is set to the braking position, the control means sets the friction brake arrangement to a position of maximum braking moment when the detected driving speed is greater than zero in a neutral position of the accelerator pedal.

10. An arrangement according to claim 1, and further comprising authorization checking means, which respond to one of a password and a key, associated with the control means so that the control means only sets the actuating drive means to a brake release position when authorized.

11. An arrangement according to claim 1, and further comprising an energy accumulator associated with the actuating drive means so that the actuating drive means draws energy required for setting the braking position of the friction brake arrangement from the energy accumulator.

12. An arrangement according to claim 11, wherein the energy accumulator is a spring accumulator.

13. An arrangement according to claim 11, wherein the energy accumulator is a fluid pressure accumulator.

14. An arrangement according to claim 1, wherein the forward/reverse drive direction selector adjusts the driving direction of rotation of the at least one electric motor, the electronic control means permitting the rotating direction of the at least electric motor to be changed when a setting of the selector is changed only when at least one of a stationary state of the vehicle is detected and after the actuating drive means has been set to the braking position.

15. An arrangement according to claim 1, wherein each electric motor drives a separate wheel of the motor vehicle and is combined in a constructional unit with the friction brake arrangement of the respective wheel.

* * * * *